United States Patent
Park

(10) Patent No.: US 8,040,482 B2
(45) Date of Patent: Oct. 18, 2011

(54) LIQUID CRYSTAL DISPLAY

(75) Inventor: Cheonghun Park, Paju-si (KR)

(73) Assignee: LG. Display Co. Ltd., Seoul (KR)

( * ) Notice: Subject to any disclaimer, the term of this patent is extended or adjusted under 35 U.S.C. 154(b) by 191 days.

(21) Appl. No.: 12/340,074

(22) Filed: Dec. 19, 2008

(65) Prior Publication Data

US 2009/0273753 A1 Nov. 5, 2009

(30) Foreign Application Priority Data

Apr. 30, 2008 (KR) .................. 10-2008-0040463

(51) Int. Cl.
*G02F 1/1345* (2006.01)
(52) U.S. Cl. ......... 349/149; 349/150; 349/151; 349/152
(58) Field of Classification Search ........... 349/149–152
See application file for complete search history.

(56) References Cited

U.S. PATENT DOCUMENTS

| 4,917,466 | A | * | 4/1990 | Nakamura et al. ............ 349/151 |
| 2002/0089614 | A1 | * | 7/2002 | Kim ................. 349/40 |
| 2007/0018680 | A1 | * | 1/2007 | Jeon et al. ..................... 324/770 |
| 2007/0718680 | | | 1/2007 | Jeong et al. |

FOREIGN PATENT DOCUMENTS

| CN | 1900802 A | 1/2007 |
| JP | 2006-317763 | 11/2006 |
| KR | 10-2005-0026588 | 3/2005 |

OTHER PUBLICATIONS

Office Action issued in corresponding Korean Patent Application No. 10-2008-0040463; issued Nov. 25, 2009.
Office Action Office Action issued in corresponding Chinese Patent Application No. 200810179435.1; issued May 6, 2010.

\* cited by examiner

*Primary Examiner* — David Nelms
*Assistant Examiner* — Phu Vu
(74) *Attorney, Agent, or Firm* — Brinks Hofer Gilson & Lione

(57) ABSTRACT

A liquid crystal display comprises: a first substrate; a display area disposed on the first substrate; subpixels disposed in the display area; a scan driver for supplying a scan signal to scan lines connected to the subpixels; a data driver for supplying a data signal to data lines connected to the subpixels; first transistors disposed on the first substrate adjacent to one side of the display area and connected to the data lines; second transistors disposed on the first substrate adjacent to the other side of the display area and connected to the scan lines; and a test pad connected to the first transistors and second transistors.

13 Claims, 5 Drawing Sheets

LIQUID CRYSTAL DISPLAY

RELATED APPLICATIONS

This application claims the benefit of Korean Patent Application No. 10-2007-0040463 filed on Apr. 30, 2008, the entire content which is hereby incorporated by reference.

BACKGROUND

1. Field

This document relates to a liquid crystal display.

2. Related Art

As information technology develops, the demand for display devices that are connecting media between users and information is increasing. Hence, the need for flat panel displays (FPDs) such as liquid crystal displays (LCDs), organic light emitting diodes (OLEDs), and plasma display panels (PDPs), is increasing. Of these, liquid crystal displays are widely used because they have a high resolution and can be big as well as small.

Liquid crystal displays are classified as light-receiving displays. Such a light-receiving display can display an image by receiving a light source from a backlight unit disposed below a liquid crystal panel. The liquid crystal display includes a transistor array substrate and a color filter substrate. The transistor array substrate includes a gate, a semiconductor layer, a transistor including a source and drain, and subpixels including a pixel electrode connected to the source or drain of the transistor. A color filter and a black matrix are formed on the color filter substrate.

After the production of the product, a lighting test of a panel is carried out on the liquid crystal display. Conventionally, to carry out the lighting test of a panel, a method of arranging a test pad within a bump of a driving IC (integrated circuit) and contacting a probe connected to a test instrument has been used.

However, the conventional method was problematic in that the size of the test pad is small because the test pad was disposed within the bump of the driving IC and this causes a wrong contact with the probe, thereby making it difficult to carry out the lighting test or the like. Moreover, there are a lot of problems, including design limitations, because a test pad needs to be formed when selecting a driving IC.

BRIEF SUMMARY

An aspect of this document is to provide a liquid crystal display, comprising: a first substrate; a display area disposed on the first substrate; subpixels disposed in the display area; a scan driver for supplying a scan signal to scan lines connected to the subpixels; a data driver for supplying a data signal to data lines connected to the subpixels; first transistors disposed on the first substrate adjacent to one side of the display area and connected to the data lines; second transistors disposed on the first substrate adjacent to the other side of the display area and connected to the scan lines; and a test pad connected to the first transistors and second transistors.

BRIEF DESCRIPTION OF THE DRAWINGS

The accompanying drawings, which are included to provide a further understanding of the invention and are incorporated on and constitute a part of this specification illustrate embodiments of the invention and together with the description serve to explain the principles of the invention.

DETAILED DESCRIPTION OF THE DRAWINGS AND THE PRESENTLY PREFERRED EMBODIMENTS

Reference will now be made in detail embodiments of the invention examples of which are illustrated in the accompanying drawings.

Hereinafter, concrete exemplary embodiments according to the present invention will be described with reference to the accompanying drawings.

Figure 1:
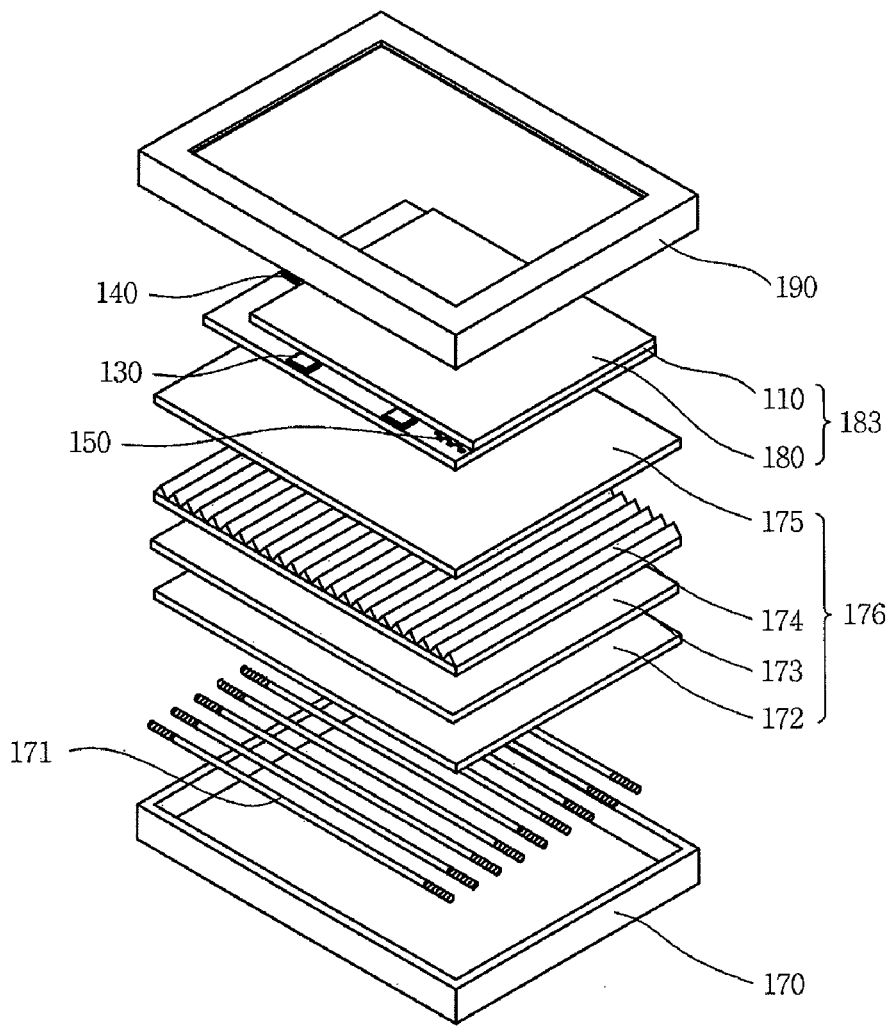
FIG. 1 is an exploded perspective view of a liquid crystal display according to one exemplary embodiment of the present invention.

As shown in FIG. 1, a liquid crystal display may comprise a light source 171 for emitting light. Further, the liquid crystal display may comprise an optical film layer 176 for guiding the light emitted from the light source 171. The optical film layer 176 may comprise a diffusion plate 172, a diffusion sheet 173, an optical sheet 174, and a protection sheet 175 that are disposed over the light source 171.

The light source 171 may be one selected from, for example, a cold cathode fluorescent lamp CCFL, a hot cathode fluorescent lamp HCFL, an external electrode fluorescent lamp EEFL, and a light emitting diode LED, but is not limited thereto. Also, the light source 171 may be one selected from an edge type having a lamp disposed at the outer side of one side surface, a dual type having lamps disposed at both side surfaces, and a direct-down type having a plurality of lamps linearly arranged, but is not limited thereto. Such a light source 171 is connected to an inverter and can emit light by receiving power.

Figure 2:
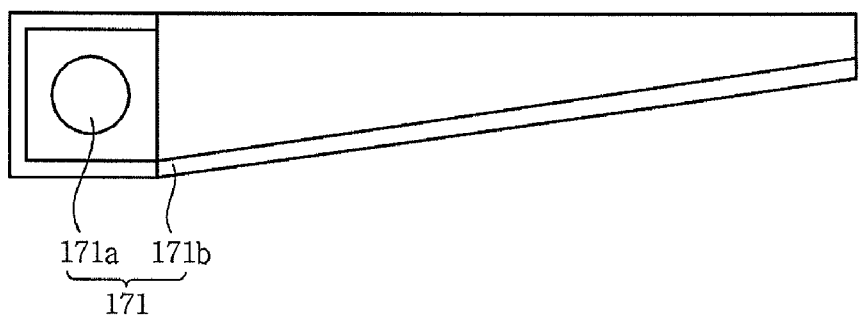
FIG. 2 is one illustration of an edge type light source.

The light source 171 illustrated in FIG. 1 is a direct-down type shown by way of example. In contrast, referring to FIG. 2, an edge type light source 171 is illustrated. The edge type light source 171 as illustrated may comprises a lamp 171a provided at the outer side of one side surface and a light guide plate 171b for guiding a light emitted from the lamp 171a, but is not limited thereto.

The aforementioned optical sheet 174 may have, for example, a prism shape as illustrated, or may be provided in the shape of a lenticular lens, a microlens, or the like, but is not limited thereto.

The liquid crystal display may comprise a liquid crystal panel 183 for displaying an image, an upper casing 190 for accommodating the light source 171, and a lower casing 190. The lower casing 170 may accommodate the light source 171. The liquid crystal panel 183 may be disposed over the light source 171 at a predetermined interval therefrom. The liquid crystal panel 183 and the light source 171 may be fixed and protected by the upper casing 190 fastened to the lower casing 170. An opening for exposing an image display area of the liquid crystal panel 183 maybe provided on the upper surface of the upper casing 190. Further, a mold frame (not shown) may be further included where the peripheral portion of the optical film layer 176 disposed between the liquid crystal panel 183 and the light source 171 is situated.

The liquid crystal panel 183 may have a structure in which a first substrate 110 having a thin film transistor array formed thereon and a second substrate 180 having a color filter formed thereon are joined together with a liquid crystal layer disposed therebetween. On the liquid crystal panel 183, subpixels independently driven by a thin film transistor are arranged in a matrix pattern.

The subpixels disposed on the first substrate 110 of the liquid crystal panel 183 can receive a driving signal from the driving IC. The driving IC may comprise a data driver 130 for supplying a data signal to the subpixels and a scan driver 140 for supplying a scan signal to the subpixels. At least one of the data driver 130 and scan driver 140 may be directly mounted on the first substrate 110 through a COG (Chip On Glass) fashion, or may be formed and stored on the first substrate 110 in a thin film transistor formation process.

In accordance with this structure, upon receipt of a scan signal, the respective subpixels disposed on the first substrate 110 control the arrangement of liquid crystals according to a difference voltage between a common voltage supplied to a common electrode and a data signal supplied to a pixel electrode connected to the thin film transistor.

Hereinafter, the structure of the subpixels will be described with reference to a schematic cross sectional view.

However, liquid crystal cells can be omitted in terms of the characteristics of the drawing.

Figure 3:
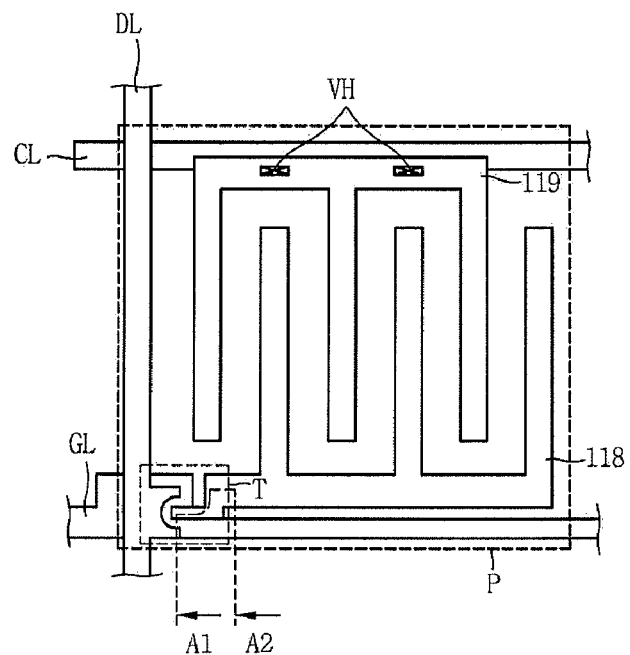
FIG. 3 is a schematic plan illustration of subpixels.

As shown in FIG. 3, a subpixel P may be disposed at an intersection of a data line DL, a scan line GL, and a common voltage line CL.

A transistor T may be disposed at the intersection of the data line DL and the scan line GL, and a pixel electrode 118 may be connected to the drain or source of the transistor T.

A common electrode 119 connected to the common voltage line CL may be connected through a via hole VH, but is not limited thereto. Here, the common voltage line CL and the common electrode 119 can form a capacitor by interposing an insulation layer therebetween.

Figure 4:
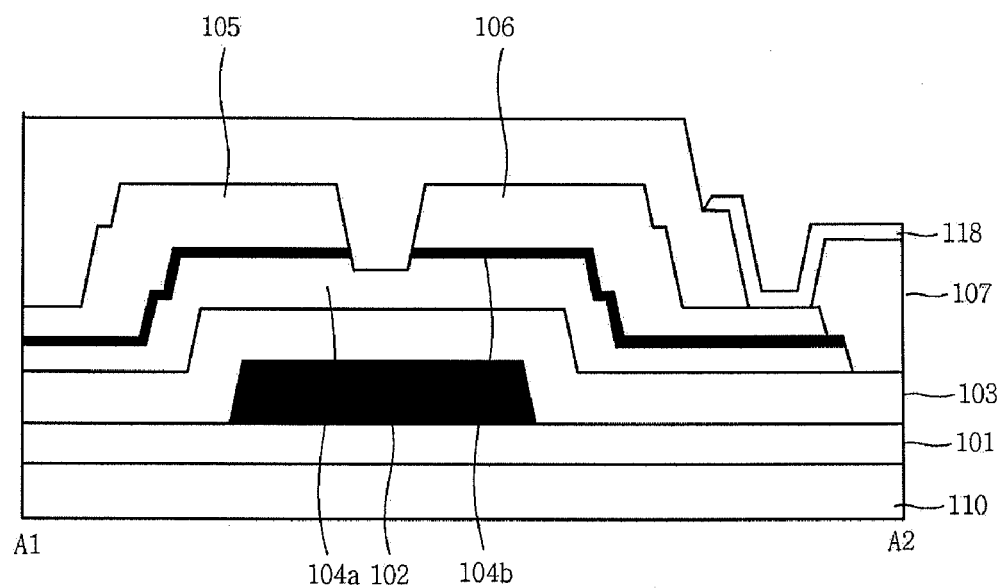
FIG. 4 is a cross sectional view of the area A1-A2 of FIG. 3.

Hereinafter, the transistor T illustrated in FIG. 3 will be described with reference to FIG. 4.

The transistor T may comprise a gate 102 disposed on a buffer layer 101 formed on the first substrate 110. The gate 102 may be made of one selected from the group consisting of molybdenum (Mo), aluminum (Al), chrome (Cr), gold (Au), titanium (Ti), nickel (Ni), neodymium (Nd), and copper (Cu) or an alloy thereof. Also, the gate 102 may be a multilayer which is made of selected from the group consisting of molybdenum (Mo), aluminum (Al), chrome (Cr), gold (Au), titanium (Ti), nickel (Ni), neodymium (Nd), and copper (Cu), or an alloy thereof. Also, the gate 102 may be a double layer of molybdenum/aluminum-neodymium or molybdenum/aluminum.

In addition, the transistor T may comprise a first insulating film 103 disposed on the gate 102. The first insulating film 103 may be a silicon oxide film SiOx, a silicon nitride film SiNx, or a multi-layer thereof, but is not limited thereto.

In addition, the transistor T may comprise an active layer 104a disposed on the first insulating film 103. Further, the transistor T may comprise an ohmic contact layer 104b disposed on the source and drain regions, respectively, defined on the active layer 104a. The ohmic contact layer 104b may be provided to reduce electrical contact resistance.

In addition, the transistor T may comprise a drain 105 and source 106 contacting the active layer 104a and ohmic contact layer 104b. The drain 105 and source 106 may be made of a single layer or a multi-layer. If the drain 105 and source 106 are a single layer, they may be made of one selected from the group consisting of molybdenum (Mo), aluminum (Al), chrome (Cr), gold (Au), titanium (Ti), nickel (Ni), neodymium (Nd), and copper (Cu), or an alloy thereof. If the drain 105 and source 106 are a multi-layer, they may be made of a trilayer of molybdenum/aluminum/molybdenum or molybdenum/aluminum-neodymium/molybdenum.

In addition, the transistor T may comprise a second insulating film 107 disposed on the drain 105 and source 106. The second insulating film 107 may be a silicon oxide film SiOx, a silicon nitride film SiNx, or a multi-layer thereof, but is not limited thereto. The second insulating film 107 may be a passivation film.

The drain 105 or source 106 of the thus formed transistor T may be connected to the pixel electrode 118 disposed on the second insulating film 107. The pixel electrode 118 may be one of ITO (Indium Tin Oxide), IZO (Indium Zinc Oxide), and ZnO (Zinc Oxide).

In the above embodiment, the gate 102 may be connected to a scan line, and the drain 105 or source 106 may be connected to a data line.

Hereinafter, the first transistors, second transistors, and test pad disposed on the first substrate will be described with reference to the schematic plan view.

Figure 5:
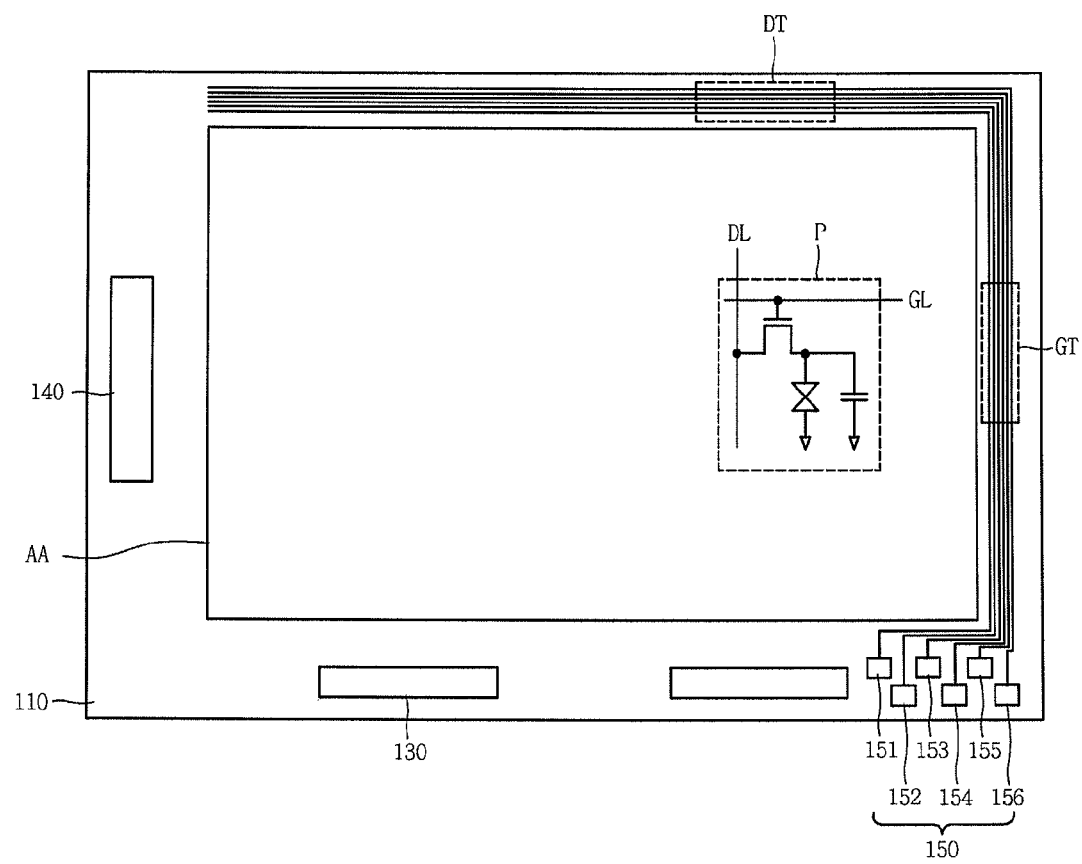
FIG. 5 is a schematic plan view of a first substrate according to one exemplary embodiment of the present invention.
Figure 6:
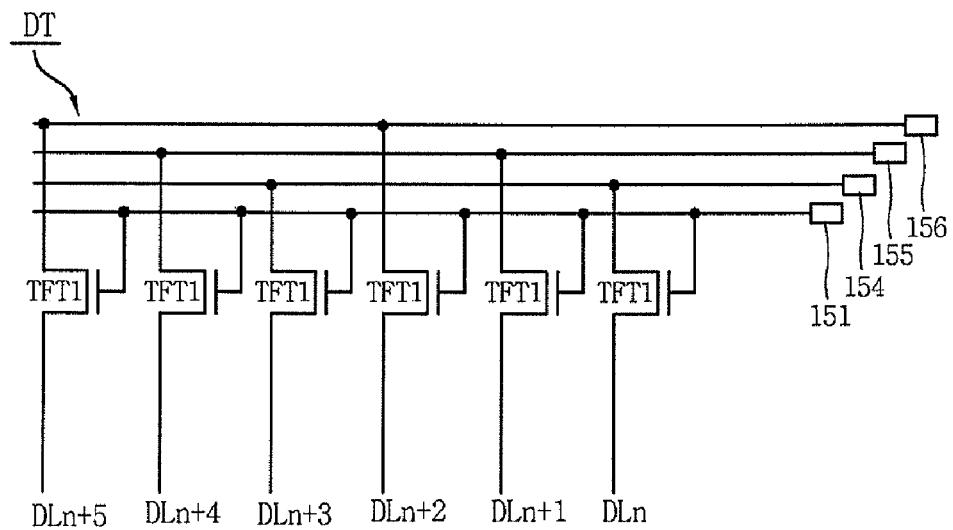
FIG. 6 is an enlarged view of the DT area as shown in FIG. 5.
Figure 7:
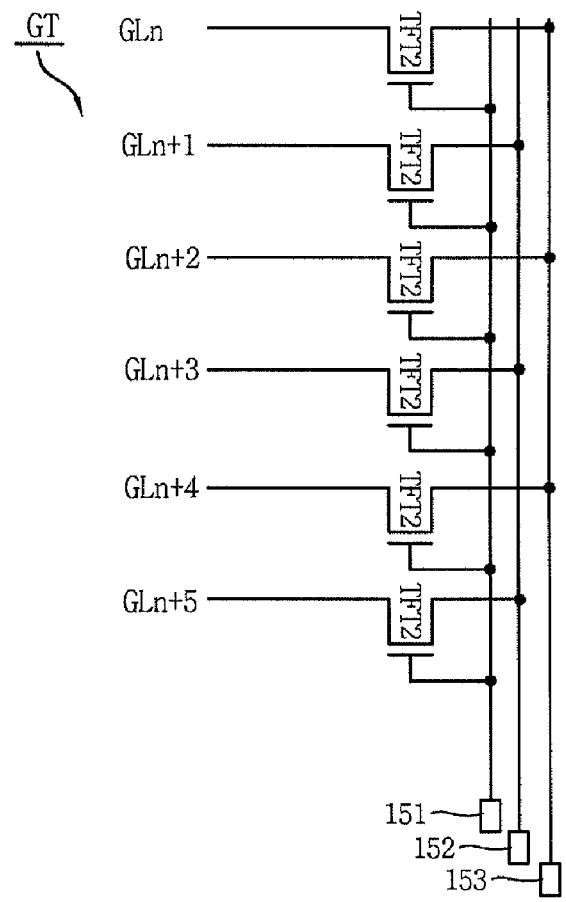
FIG. 7 is an enlarged view of the GT area as shown in FIG. 5.

Referring to FIGS. 5 to 7, a display area AA is disposed on the first substrate 110. Subpixels P connected to one data line DL and one scan line GL are disposed in a matrix pattern in the display area AA.

In addition, the scan driver 140 for supplying a scan signal to the scan lines GL connected to the subpixels P and the data driver 130 for supplying a data signal to the data lines DL connected to the subpixels P are disposed on the first substrate 110. Here, the scan driver 140 and the data driver 130 are mounted on the first substrate 110 in a COG (chip on glass) fashion.

In addition, first transistors TFT1 connected to data lines DLn . . . DLn+5 may be disposed on the first substrate 110 adjacent to one side of the display area AA, and second transistors TFT2 connected to scan lines GLn . . . GLn+5 may be disposed on the first substrate 110 adjacent to the other side of the display area AA.

Here, the first transistors TFT1 and second transistors TFt2 may be formed through the same process when forming at least either the subpixels P, data driver 130, or scan driver 140 disposed on the first substrate 110, but are not limited In the above explanation, the number of the first transistors TFT1 may correspond to the number of the data lines DLn . . . DLn+5 and the number of the second transistors TFT2 may correspond to the number of the scan lines GLn . . . GLn+5.

More specifically, the first transistors TFT1 and second transistors TFT2 are formed to correspond to the respective data lines DLn . . . DLn+5 and the respective scan lines GLn . . . GLn+5 and supply a signal supplied from the test pad 150 to the corresponding subpixels.

The test pad 150 is disposed on the first substrate 110, and connected to the first transistors TFT1 and second transistors TFT2.

The test pad 150 may comprise a first pad group 154, 155, and 156 for supplying a first test signal to the subpixels P through the first transistors TFT1, a second pad 151 for supplying a control signal to drive the first transistors TFT1, a third pad group 152 and 153 for supplying a second test signal to the subpixels through the second transistors TFT2, and a fourth pad 151 for supplying a control signal to drive the second transistors TFT2.

Here, the first pad group 154, 155, and 156 comprises a red pad 154, a green pad 155, and a blue pad 156, and the first test signal supplied through the red pad 154, green pad 155, and blue pad 156 may comprise red, green, and blue data signals, respectively. That is to say, the first pad group 154, 155, and 156 are pads for supplying red, green, and blue data signals to the subpixels P.

Here, the third pad group 152 and 153 comprises an odd pad 152 and an even pad 153, and the second test signals supplied through the odd pad 152 and even pad 153 may comprise an odd scan signal and an even scan signal, respectively. That is to say, the third pad group 152 and 153 are pads for supplying a scan signal.

As the third pad group 152 and 153 is divided into an odd pad 152 and an even pad 153, scan signals are alternately supplied to odd and even lines for each scan line. However, the third pad group 152 and 153 may be integratedly formed without being divided into the odd pad 152 and the even pad 153, and accordingly scan signals may be sequentially supplied for each scan line.

In the above explanation, the second pad 151 and the fourth pad 151 are pads for supplying a control signal to drive the first transistors TFT1 and second transistors TFT2, and they may be formed separately on the first substrate 110 or formed as one pad.

As above, the test pad 150 formed on the first substrate 110 is a pad with which a test probe comes into contact, and may comprise a total of six pads 151, 152, 153, 154, 155, and 156, but the number of pads may be varied according to a design method.

Meanwhile, the test pad 150 may be disposed anywhere on the first substrate 110 adjacent to the outer side of the display area AA. However, in general, the data driver 130 and the scan driver 140 are formed at positions as shown in FIG. 5. In this case, signal lines connecting between the subpixels P, the scan driver 140, and the data driver 130 are wired around the display area AA.

Therefore, it is advantageous that the test pad 150 is formed on the corner regions of the first substrate 110 adjacent to the data driver 130 so as to enable a fine pitch design. In this way, when the test pad 150 is disposed on the corner regions of the first substrate 110 adjacent to the data driver 130, wiring lines connecting between the first transistors TFT1 and second transistors TFT2 and the test pad 150 may be wired along the outer surface of the display area AA opposed to the area where the data driver 130 and the scan driver 140 are disposed.

As seen from above, in one exemplary embodiment of the present invention, the test pad 150 is not disposed within the bump of the driving IC unlike the conventional art, and, hence, spatial limitations caused by the structure in the bump and test signal lines are relatively minor, thereby enabling it to offer flexibility in the selection of the driving IC. More than anything else, in the one exemplary embodiment of the present invention, the test pad 150 used for a panel lighting test, such as a red, green, and blue pattern test and a grey, black, and white pattern test, can be formed larger than a conventionally used pad, thereby making a contact between the test pad 150 and the test probe easier and drastically reducing the rate of pin misalignment when there is a contact between them.

Besides, the one exemplary embodiment of the present invention can provide advantages for various after-process panel tests because the manufacturing cost of test instruments can be reduced and a laser trimming process for test pad removal can be omitted.

Hereinafter, another exemplary embodiment of the present invention will be described.

Figure 8:
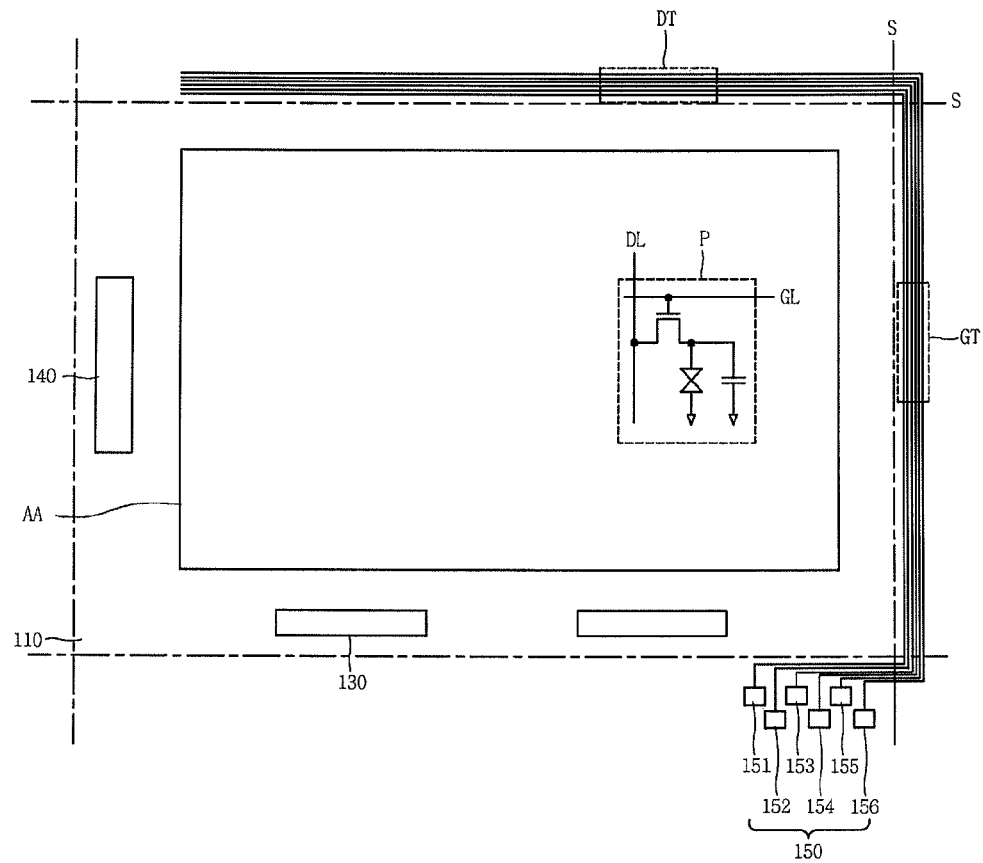
FIG. 8 is a schematic plan view of a first substrate according to another exemplary embodiment of the present invention.
Figure 9:
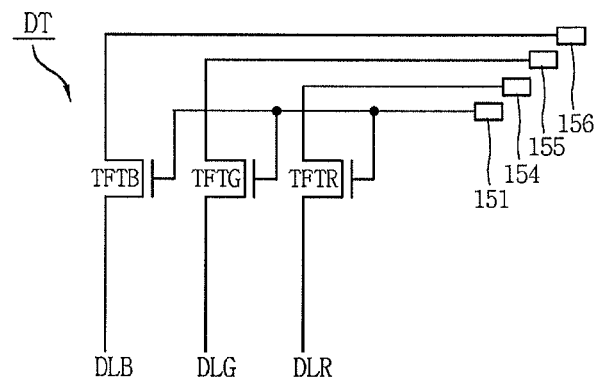
FIG. 9 is an enlarged view of the DT area as shown in FIG. 8.

Descriptions will be given with reference to FIGS. 8 and 9, but portions overlapping with those of the aforementioned one exemplary embodiment of the present invention will be omitted.

According to another embodiment of the present invention, first transistors, second transistors, and a test pad 150 may be formed on the outer side of a scribing line S for cutting a first substrate 110 into cells. In this structure, however, a space enough to form the first transistors, second transistors, and test pad 150 is required between the cells.

The first transistors formed on the outer side of the scribing line S defined on the first substrate 110 comprise a first red transistor TFTR for supplying a red data signal to the subpixels P, a first green transistor TFTG for supplying a green data signal to the subpixels P, and a first blue transistor TFTB for supplying a blue data signal to the subpixels P. In addition, a red data line DLR, a green data line DLG, and a blue data line DLB may be separated from each other outside the scribing line S and commonly connected to each other.

In this case, all the red data line DLR, green data line DLG, and blue data line DLB may receive a red data signal, a green data signal, and a blue data signal, separately, through the first red transistor TFTR, first green transistor TFTG, and first blue transistor TFTB.

In this structure, even if only three of the first red transistor TFTR, first green transistor TFTG, and first blue transistor TFTB are provided without forming first transistors for the respective data lines DLR, DLG, and DLB, a red data signal, a green data signal, and a blue data signal can be separately supplied to each subpixel P.

Also, if a panel lighting test is performed and the scribing line S defined on the first substrate 110 is cut out, the problem of short circuiting between the pads caused by impurities formed on the test pad 150 can be solved, thereby preventing an abnormal operation of the circuit connected to the test pad 150.

As seen from above, in the another exemplary embodiment of the present invention, the test pad 150 is not disposed within the bump of the driving IC unlike the conventional art, and, hence, spatial limitations caused by the structure in the bump and test signal lines are relatively minor, thereby enabling it to offer flexibility in the selection of the driving IC.

In particular, in the one exemplary embodiment of the present invention, the test pad 150 used for a panel lighting test, such as a red, green, and blue pattern test and a grey, black, and white pattern test, can be formed larger than a conventionally used pad, thereby making a contact between the test pad 150 and the test probe easier and drastically reducing the rate of pin misalignment when there is a contact between them.

As seen from the above description, the exemplary embodiment of the present invention can provide a liquid crystal display which can further improve the reliability of a panel lighting test because it offers the easiness of a panel lighting test and flexibility in the selection of the driving IC and enables a fine pitch design in the formation of a test pad.

The foregoing embodiments and advantages are merely exemplary and are not to be construed as limiting the present invention. The present teaching may be readily applied to other types of apparatuses. The description of the foregoing embodiments is intended to be illustrative, and not to limit the scope of the claims. Many alternatives, modifications, and variations will be apparent to those skilled in the art. In the claims, means-plus-function claims are intended to cover the structures described herein as performing the recited function and not only structural equivalents, but also equivalent structures. Moreover, unless the term "means" is explicitly recited in a limitation of the claims, such limitation is not intended to be interpreted under 35 USC 112(6).

The invention claimed is:

1. A liquid crystal display, comprising:
   a first substrate;
   a display area disposed on the first substrate;
   subpixels disposed in the display area;
   a scan driver disposed on a first side of the first substrate and that supplies a scan signal to scan lines connected to the subpixels;
   a data driver disposed on a opposite side of the first substrate and that supplies a data signal to data lines connected to the subpixels;
   first transistors disposed on a opposite side of the data driver and connected to the data lines;
   second transistors disposed on a opposite side of the scan driver and connected to the scan lines; and
   a test pad disposed on a corner of the first substrate and connected to the first transistors and second transistors,
   wherein the test pad comprises:
   a first pad group for supplying a first test signal to the subpixels through the first transistors;
   a second pad for supplying a control signal to drive the first transistors;
   a third pad group for supplying a second test signal to the subpixels through the second transistors; and
   a fourth pad for supplying a control signal to drive the second transistors,
   wherein the second pad and the fourth pad are formed as one pad.

2. The liquid crystal display of claim 1, wherein the number of the first transistors correspond to the number of the data lines.

3. The liquid crystal display of claim 1, wherein the number of the second transistors correspond to the number of the scan lines.

4. The liquid crystal display of claim 1, wherein the first pad group comprises a red pad, a green pad, and a blue pad, and the first test signal supplied through the red pad, green pad, and blue pad comprises red, green, and blue data signals, respectively.

5. The liquid crystal display of claim 1, wherein the third pad group comprises an odd pad and an even pad, and the second test signal supplied through the odd pad and the even pad comprises an odd scan signal and an even scan signal, respectively.

6. The liquid crystal display of claim 1, wherein at least one of the scan driver and the data driver is disposed in a chip on glass fashion, being mounted on the first substrate at the outer side of the display area.

7. The liquid crystal display of claim 1, wherein the test pad is disposed on the corner regions of the first substrate adjacent to the data driver.

8. The liquid crystal display of claim 1, wherein wiring lines connecting between the first transistors and second transistors and the test pad are wired along the peripheral area of the display area respectively opposed to the area where the data driver and the scan driver are disposed.

9. The liquid crystal display of claim 1, wherein the test pad is a pad to which a test pad comes into contact, and comprises six pads.

10. The liquid crystal display of claim 1, wherein the first transistors, the second transistors, and the test pad are disposed outside the scribing line for cutting the first substrate into cells.

11. The liquid crystal display of claim 10, wherein the first transistors comprise:
    a first red transistor for supplying a red data signal to the subpixels;
    a first green transistor for supplying a green data signal to the subpixels; and
    a first blue transistor for supplying a blue data signal to the subpixels.

12. The liquid crystal display of claim 11, wherein the data lines comprise a red data line, a green data line, and a blue data line, and the red data line, green data line, and blue data line are separated from each other outside the scribing line and commonly connected to each other.

13. The liquid crystal display of claim 7, wherein wiring lines connecting between the first transistors and second transistors and the test pad are wired along the outer surface of the display area opposed to the area where the data driver and the scan driver are disposed.

* * * * *